(12) United States Patent
Mchugh et al.

(10) Patent No.: US 12,122,269 B2
(45) Date of Patent: Oct. 22, 2024

(54) CHILD RESTRAINT WITH TETHER

(71) Applicant: Dorel Juvenile Group, Inc., Foxboro, MA (US)

(72) Inventors: William P. Mchugh, Norfolk, MA (US); Jason H. Johnson, Brownstown, IN (US)

(73) Assignee: Dorel Juvenile Group, Inc., Foxboro, MA (US)

(*) Notice: Subject to any disclaimer, the term of this patent is extended or adjusted under 35 U.S.C. 154(b) by 62 days.

(21) Appl. No.: 17/880,051

(22) Filed: Aug. 3, 2022

(65) Prior Publication Data

US 2023/0039629 A1    Feb. 9, 2023

Related U.S. Application Data

(60) Provisional application No. 63/230,198, filed on Aug. 6, 2021.

(51) Int. Cl.
*B60N 2/28* (2006.01)
*B60N 2/26* (2006.01)

(52) U.S. Cl.
CPC ........... *B60N 2/2809* (2013.01); *B60N 2/265* (2013.01); *B60N 2/2857* (2013.01); *B60N 2/2869* (2013.01)

(58) Field of Classification Search
CPC ... B60N 2/2809; B60N 2/2869; B60N 2/2821
See application file for complete search history.

(56) References Cited

U.S. PATENT DOCUMENTS

| | | | |
|---|---|---|---|
| 5,857,832 A * | 1/1999 | Al-Temen | B60N 2/2812 280/727 |
| 6,318,807 B1 | 11/2001 | Perego | |
| 7,338,122 B2 | 3/2008 | Hei | |
| 7,559,606 B2 | 7/2009 | Hei | |
| 7,575,276 B1 | 8/2009 | Henry | |
| 7,735,921 B2 | 6/2010 | Hutchinson | |
| 7,770,970 B2 | 8/2010 | Hei | |
| 7,828,381 B2 | 11/2010 | Barger | |
| 7,887,129 B2 | 2/2011 | Hei | |
| 8,235,465 B2 | 8/2012 | Hei | |
| 8,256,841 B2 | 9/2012 | Hei | |
| 8,317,265 B2 | 11/2012 | Hutchinson | |
| 8,328,275 B2 | 12/2012 | Vogt | |
| 8,474,907 B2 | 7/2013 | Weber | |
| 8,511,749 B2 | 8/2013 | Hei | |
| 8,616,632 B2 | 12/2013 | Cheng | |
| 8,905,478 B2 | 12/2014 | Strong | |
| 9,090,182 B2 | 7/2015 | Rabeony | |
| 9,487,111 B2 | 11/2016 | Lake | |
| 10,173,553 B2 | 1/2019 | Mitchell | |
| 10,315,537 B2 | 6/2019 | Renaudin | |
| 10,384,570 B2 | 8/2019 | Pline | |
| 10,406,947 B2 | 9/2019 | Anderson | |

(Continued)

*Primary Examiner* — David R Dunn
*Assistant Examiner* — Tania Abraham
(74) *Attorney, Agent, or Firm* — Barnes & Thornburg LLP

(57) ABSTRACT

A child restraint includes a seat base adapted to rest on a vehicle seat and a juvenile seat adapted to couple to the seat base. The seat base includes a seat-base foundation configured to support the juvenile seat and a tether strap coupled to an upper end of the seat-base foundation and adapted to be fixed to a tether-strap anchor coupled to the vehicle seat.

16 Claims, 5 Drawing Sheets

(56) References Cited

U.S. PATENT DOCUMENTS

| | | |
|---|---|---|
| 10,457,168 B2 | 10/2019 | Anderson |
| 10,464,451 B2 | 11/2019 | Stamper |
| 10,583,756 B2 | 3/2020 | Anderson |
| 10,688,892 B2 | 6/2020 | Anderson |
| 10,710,478 B2 | 7/2020 | Reaves |
| 10,766,384 B2 | 9/2020 | Schmitz |
| 10,780,800 B2 | 9/2020 | Kaiser |
| 11,420,540 B2 | 8/2022 | Williams |
| 11,427,114 B2 | 8/2022 | Keegan |
| 2002/0043836 A1* | 4/2002 | Maciejczyk ......... B60N 2/2869 297/250.1 |
| 2007/0068282 A1* | 3/2007 | Nakagawa ............. B60R 22/48 73/862.453 |
| 2007/0114774 A1* | 5/2007 | Lang .................... B60N 2/2809 280/805 |
| 2014/0070581 A1* | 3/2014 | Rabeony .............. B60N 2/2869 297/256.16 |
| 2015/0336481 A1* | 11/2015 | Horsfall ............... B60N 2/2863 297/256.16 |
| 2016/0332542 A1* | 11/2016 | Cohen ................. B60N 2/2884 |
| 2019/0077282 A1 | 3/2019 | Reaves |
| 2019/0217751 A1* | 7/2019 | Kaiser ................. B60N 2/2803 |
| 2019/0232827 A1 | 8/2019 | Maciejczyk |
| 2021/0237626 A1 | 8/2021 | Longenecker |
| 2022/0048415 A1 | 2/2022 | Keegan |
| 2022/0212575 A1 | 7/2022 | Williams |
| 2022/0219581 A1 | 7/2022 | Brunick |
| 2022/0355713 A1 | 11/2022 | Longenecker |

* cited by examiner

CHILD RESTRAINT WITH TETHER

PRIORITY CLAIM

This application claims priority under 35 U.S.C. § 119(e) to U.S. Provisional Application Ser. No. 63/230,198, filed Aug. 6, 2021, which is expressly incorporated by reference herein.

BACKGROUND

The present disclosure relates to a child restraint, and particularly to a child restraint including a seat base and a juvenile seat coupled to the seat base. More particularly, the present disclosure relates to a child restraint including a tether strap.

SUMMARY

According to the present disclosure, a child restraint includes a seat base adapted to rest on a vehicle seat and a juvenile seat adapted to couple to the seat base. The seat base includes a seat-base foundation configured to support the juvenile seat and a tether strap adapted to be fixed to a tether-strap anchor coupled to the vehicle seat.

In illustrative embodiments, the child restraint further includes a tether-strap tension indicator configured to indicate when the tether strap is fully and/or correctly installed on the tether-strap anchor. In some embodiments, the tether-strap tension indicator is coupled to the seat base to form a part thereof. In other embodiments, the tether-strap tension indicator may be coupled to the juvenile seat.

In illustrative embodiments, the tether-strap tension indicator includes a tether strap mount coupled to the tether strap and a pivot shaft coupled to the tether strap mount and to the seat-base foundation. The pivot shaft allows pivotable movement of the tether-strap tension indicator about a pivot shaft axis established by the pivot shaft between an uninstalled position and an installed position. In the uninstalled position, the tether strap mount protrudes into a juvenile seat region to indicate that the tether strap has not been fully installed. In the installed position, the tether strap mount is substantially aligned with a forward facing surface of the seat base foundation.

In illustrative embodiments, the tether-strap tension indicator further includes a rotation-motion blocker coupled to the tether strap mount for movement therewith between the uninstalled position and the installed position. In the uninstalled position, the rotation-motion blocker is configured to block rotation of the juvenile seat to a locked, forward-facing orientation thereby blocking full securement of the juvenile seat until the tether strap is fully installed. Once the tether strap is fully installed and the tether strap tension indicator is in the installed position, the juvenile seat is free to rotate to the locked, forward facing orientation to fully secure the juvenile seat for transportation in the vehicle.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a child restraint including a seat base and a juvenile seat coupled to the seat base and showing that the seat base includes a seat-base foundation, a tether strap coupled to an upper end of the seat base, and a tether-strap tension indicator configured to indicate to an installer when tension between the tether strap and a tether strap anchor has reached a predetermined threshold so that the child restraint is properly installed on a vehicle seat;

FIG. 2 is an enlarged perspective view of a portion of the child restraint of FIG. 1 showing that the tether-strap tension indicator includes a tether strap mount coupled to the tether strap, a pivot shaft coupled to the tether strap mount to allow the tether strap mount to pivot relative to the seat-base foundation between an installed position, as shown in FIG. 2, and an uninstalled position, as shown in FIG. 3, and a biasing element configured to normally bias the tether strap mount to pivot toward the uninstalled position;

FIG. 3 is an enlarged perspective view of a portion of the seat base similar to FIG. 2 showing the tether strap mount in the uninstalled position in which the tether strap mount protrudes forward toward the juvenile seat to indicate to the installer that the tether strap has not been installed and/or that the tether strap does not have sufficient tension;

FIG. 4 is a side elevation view of a portion of the seat base showing the tether strap mount in the uninstalled position and showing that the tether-strap tension indicator further includes a pair of rotation motion blockers fixed to the tether strap mount for movement therewith and that are configured to block rotation of the juvenile seat to a forward-facing orientation until the tether strap is installed to move the rotation motion blockers out of a juvenile-seat retainer travel path as shown in FIGS. 5 and 7;

Figure 8:
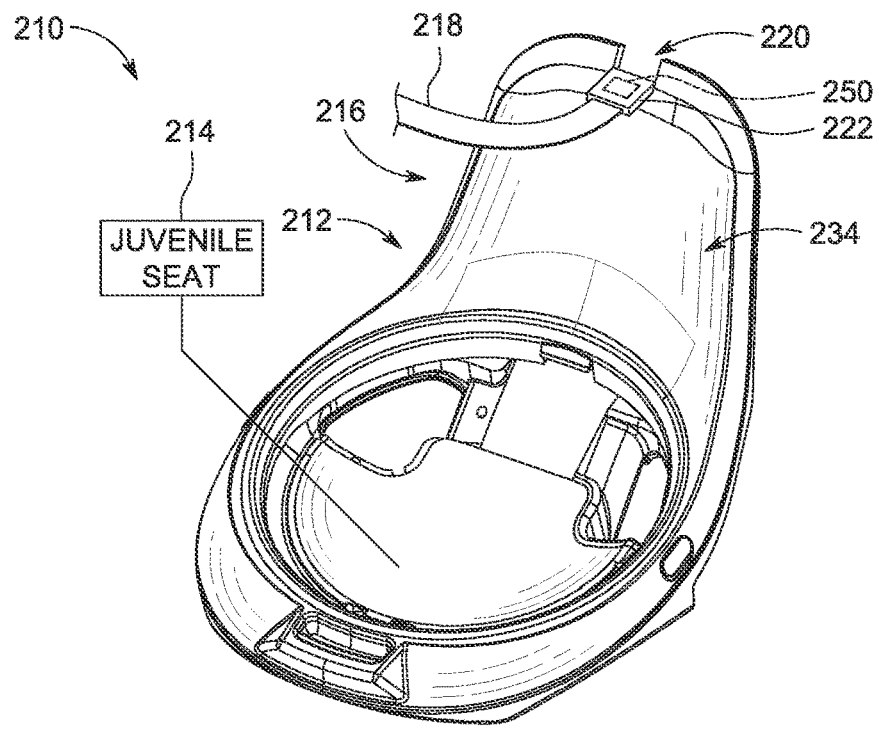
Figure 9:
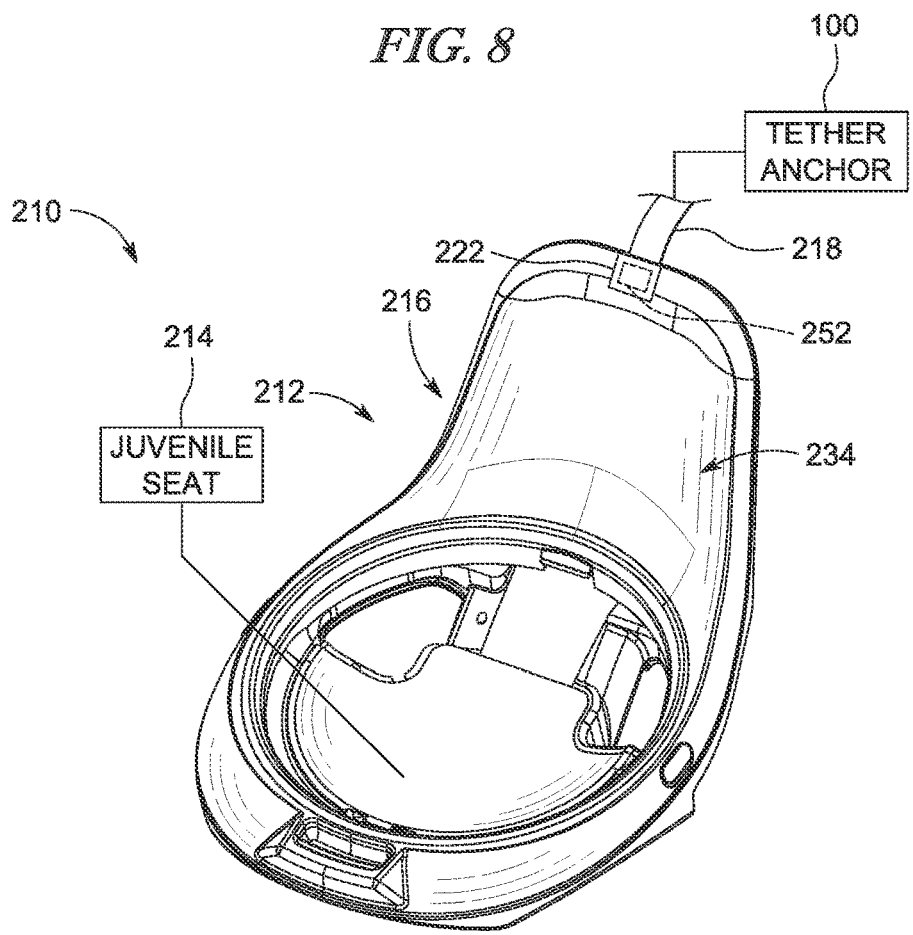

FIG. 8 is a perspective view of another seat base including a seat-base foundation, a tether strap coupled to an upper end of the seat-base foundation, and a tether-strap tension indicator having visual indicia that indicate when the tether strap is properly installed; and FIG. 9 is a perspective view similar to FIG. 8 showing the tether-strap tension indicator in an installed position after sufficient tension is applied to the tether strap.

DETAILED DESCRIPTION

Figure 1:
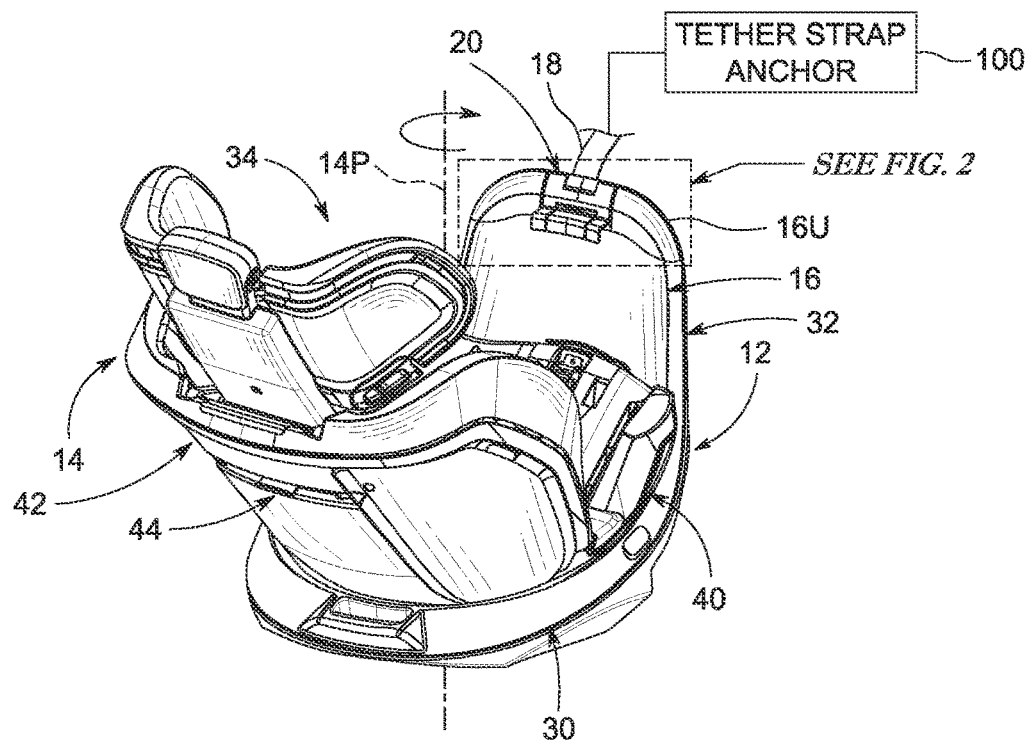

A child restraint 10, in accordance with the present disclosure, includes a seat base 12 adapted to rest on a vehicle seat (not shown) and a juvenile seat 14 adapted to couple to the seat base 12 as shown in FIG. 1. The seat base 12 includes a seat-base foundation 16 configured to support the juvenile seat 14 and a tether strap 18 coupled to an upper end 16U of the seat-base foundation 16. The tether strap 18 is configured to extend over an upper end of the vehicle seat for attachment with a tether strap anchor 100 located on a rearward facing surface of the vehicle seat. The tether strap 18 retains the seat base 12 to the vehicle seat to block the seat base 12 from separating from the vehicle seat due to inertial forces, such as a front collision event, for example. The tether strap 18 may be anchored to any suitable location within the vehicle in other embodiments.

In illustrative embodiments, the seat base 12 further includes a tether-strap tension indicator 20 extending between and interconnecting the seat-base foundation 16 and the tether strap 18 as shown in FIGS. 1-4. The tether-strap tension indicator 20 is configured to move relative to the seat-base foundation 16 between an uninstalled position, when the tether strap is separated from the tether-strap anchor 100, and an installed position, when the tether strap is attached to the tether-strap anchor and a tension force is applied to the tether strap above a predetermined threshold. The tether strap tension indicator 20 is configured to indicate to a caregiver when the tether strap 18 has adequate tension so that the tether strap 18 is properly installed on the vehicle seat.

Figure 2:
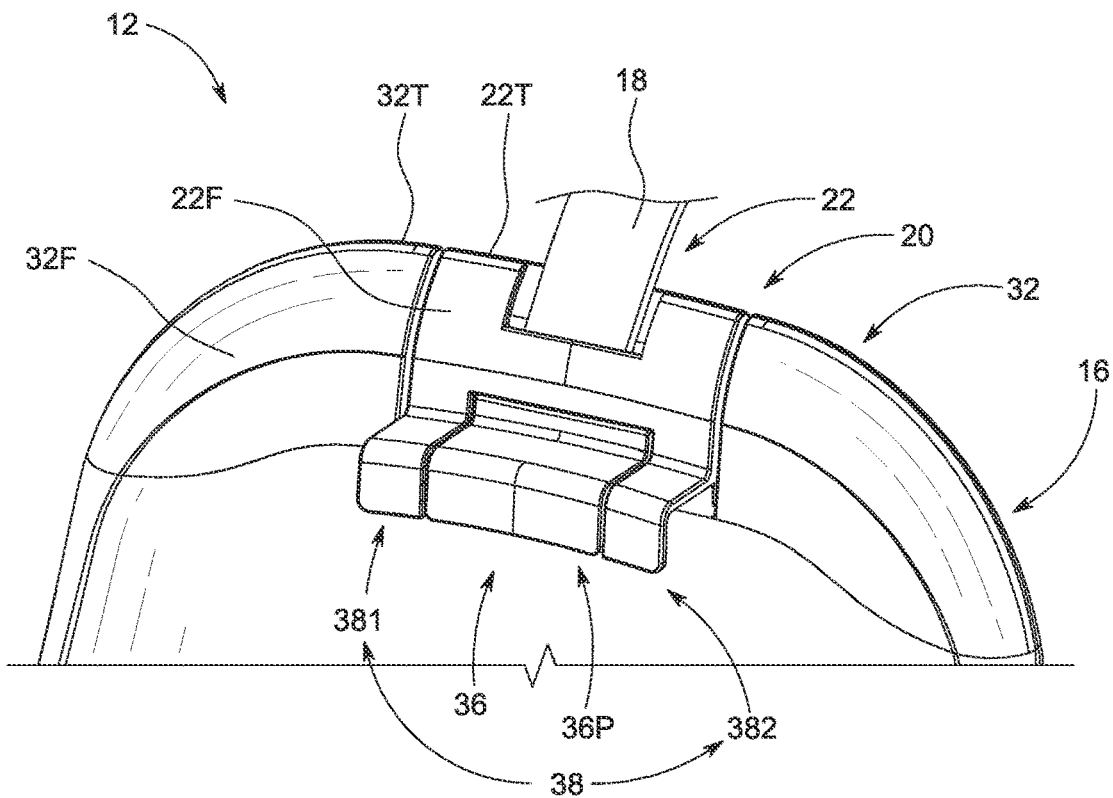
Figure 3:
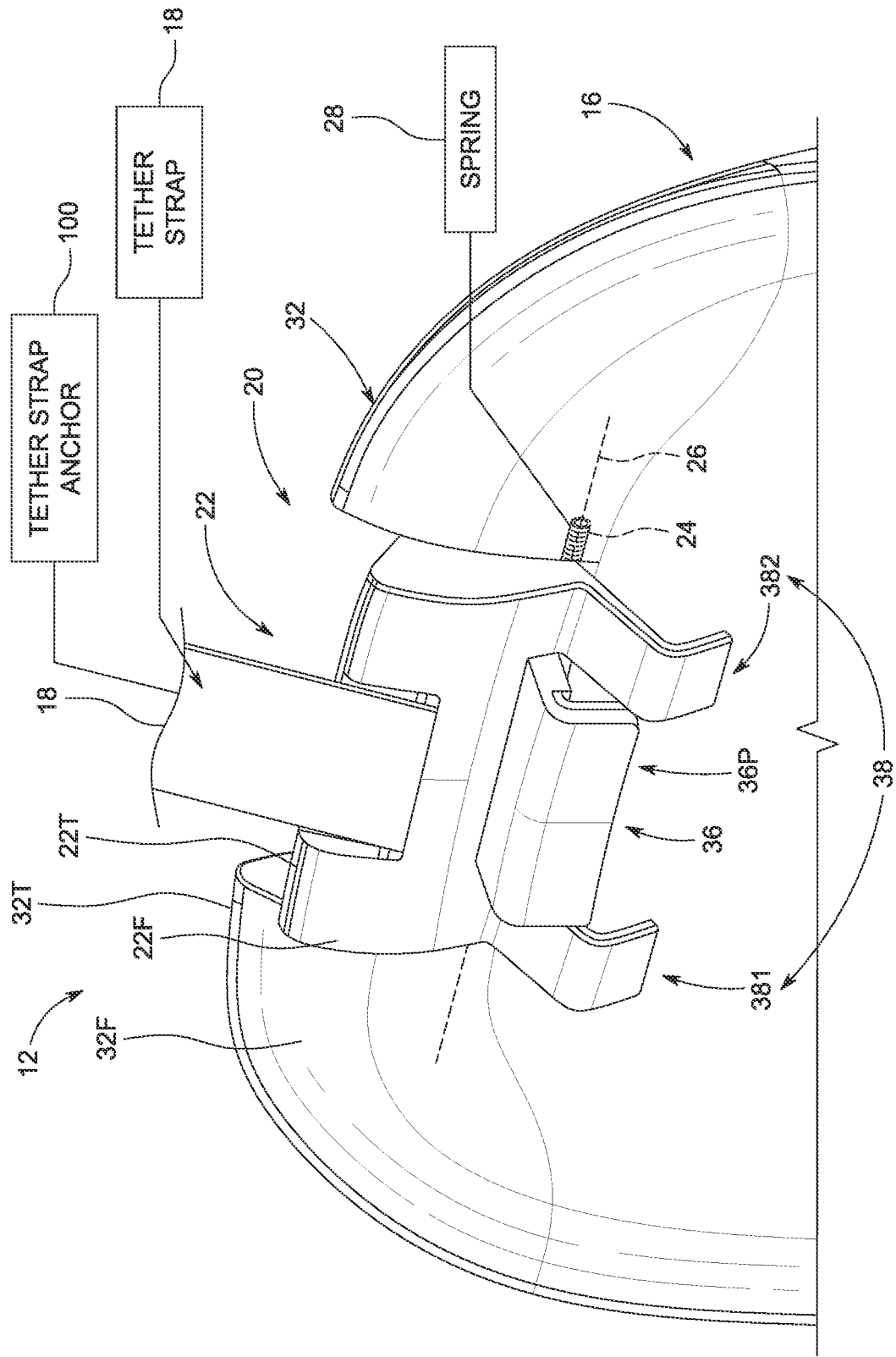
Figure 4:
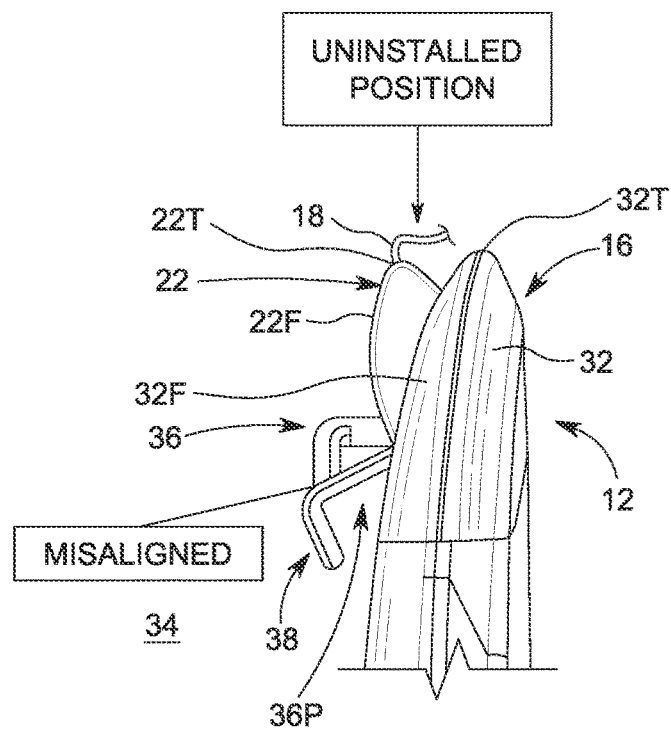
Figure 5:
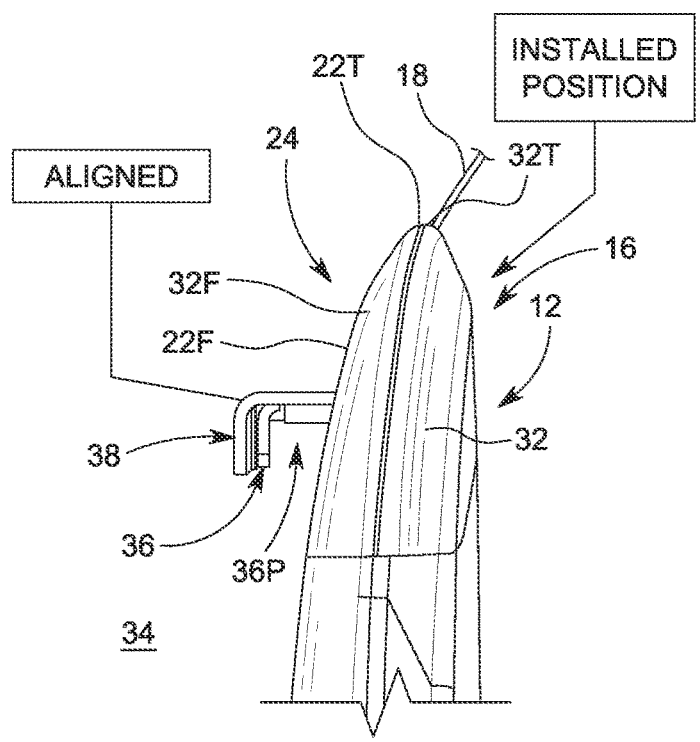
FIG. 5 is a side elevation view of a portion of the seat base similar to FIG. 4 showing the tether strap mount and rotation motion blockers in the installed position opening the juvenile-seat retainer travel path to receive a juvenile seat retainer as shown in FIG. 7.

The tether-strap tension indicator 20 includes a tether strap mount 22 coupled to the tether strap 18 and a pivot shaft 24 coupled to the tether strap mount 22 and to the seat-base foundation 16 as shown in FIG. 2. The tether strap mount 22 is mounted to the seat-base foundation 16 via the pivot shaft 24 to allow pivotable movement of the tether-strap tension indicator about a pivot shaft axis 26 established by the pivot shaft 24 between the uninstalled position, as shown in FIGS. 3 and 4, and the installed position, as shown in FIGS. 2 and 5. In some embodiments, the pivot shaft 24 can be omitted and the tether strap mount 22 can be mounted to the seat-base foundation 16 for movement relative to the seat-base foundation using different means such as sliding, for example.

The tether-strap tension indicator 20 may further include a biasing element 28 such as a spring as suggested in FIG. 3. The biasing element 28 is configured to pivot the tether strap mount 22 about the pivot shaft axis 26 toward the uninstalled position. The biasing element 28 may also be used to set the predetermined threshold for tension that must be applied to the tether strap 18 to properly install the tether strap 18. For example, a spring 28 with a higher spring coefficient can be used if a relatively higher predetermined threshold is desired and vice versa. In the illustrative embodiment, a torsion spring 28 is wrapped around the pivot shaft 24 and urges the tether strap mount toward the uninstalled position. In other embodiments, another suitable type of spring or resilient element, or none at all, may be used.

Figure 6:
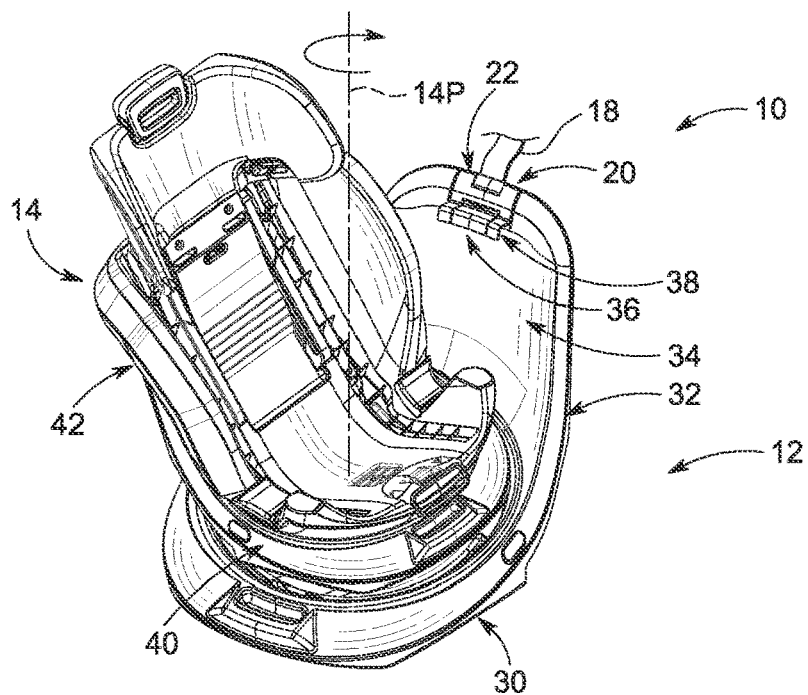
FIG. 6 is a perspective view of the child restraint showing the juvenile seat rotating toward the forward-facing orientation and the tether strap mount and rotation motion blockers in the installed position.

The seat-base foundation includes a foundation bottom 30 and a foundation backrest 32 coupled to the foundation bottom 30 as shown in FIGS. 1 and 6. The foundation bottom 30 is arranged to lie on a seat cushion of the vehicle seat. The foundation backrest 32 is arranged to extend upwardly away from the foundation bottom 30. The foundation bottom 30 and the foundation backrest 32 cooperate to define a juvenile seat region 34 above the foundation bottom 30 and forward of the foundation backrest 32.

The tether strap mount 22 is configured to protrude into the juvenile seat region 34 when the tether strap mount 22 is in the uninstalled position as shown in FIGS. 3 and 4. The tether strap mount 22 has a forward-facing surface 22F. The foundation backrest 32 has a forward-facing surface 32F. The forward-facing surface 22F of the tether strap mount 22 is offset from the forward-facing surface 32F of the foundation backrest 32 in the uninstalled position. The forward-facing surface 22F of the tether strap mount 22 is closer to the juvenile seat 14 than the forward-facing surface 32F of the foundation backrest 32 in the uninstalled position. The uninstalled position of the tether strap mount 22 provides a visual indication to a person installing the child restraint 10 in a vehicle that the tether strap 18 needs to be installed and/or does has not been installed with a tension above the predetermined threshold.

The tether strap mount 22 is configured to pivot in a rearward direction away from the juvenile seat 14 when changing from the uninstalled position to the installed position as shown in FIGS. 2-5. The forward-facing surface 22F of the tether strap mount 22 is flush or aligned with the forward-facing surface 32F of the foundation backrest 32 in the installed position. The forward-facing surface 22F of the tether strap mount 22 is the same distance from the juvenile seat 14 as the forward-facing surface 32F of the foundation backrest 32 in the installed position.

The tether strap mount 22 has a top edge 22T that is aligned with a top edge 32T of the foundation backrest in the installed position as shown in FIGS. 2 and 5. The top edge 22T of the tether strap mount 22 is misaligned with the top edge 32T of the foundation backrest 32T in the uninstalled position as shown in FIGS. 3 and 4.

The seat base 12 further includes a retainer support 36 fixed to the foundation backrest 32 and that protrudes forward from the forward facing surface 32F into the juvenile seat region 34 as shown in FIGS. 4 and 5. The retainer support 36 defines a juvenile-seat retainer travel path 36P between the forward facing surface 32F of the foundation backrest 32 and a portion of the retainer support 36. The tether-strap tension indicator 20 further includes a rotation motion blocker 38 that has a similar shape to the retainer support when viewed from the side and that extends outward away from the forward facing surface 22F of the tether strap mount 22 for movement with the tether strap mount 22. In the uninstalled position, the rotation motion blocker 38 is misaligned with retainer support 36 and overlaps with the juvenile-seat retainer travel path 36P as shown in FIG. 4. In the installed position, the rotation motion blocker 38 is aligned with the retainer support 36 to expose the juvenile-seat travel path 36P as shown in FIG. 5.

Figure 7:
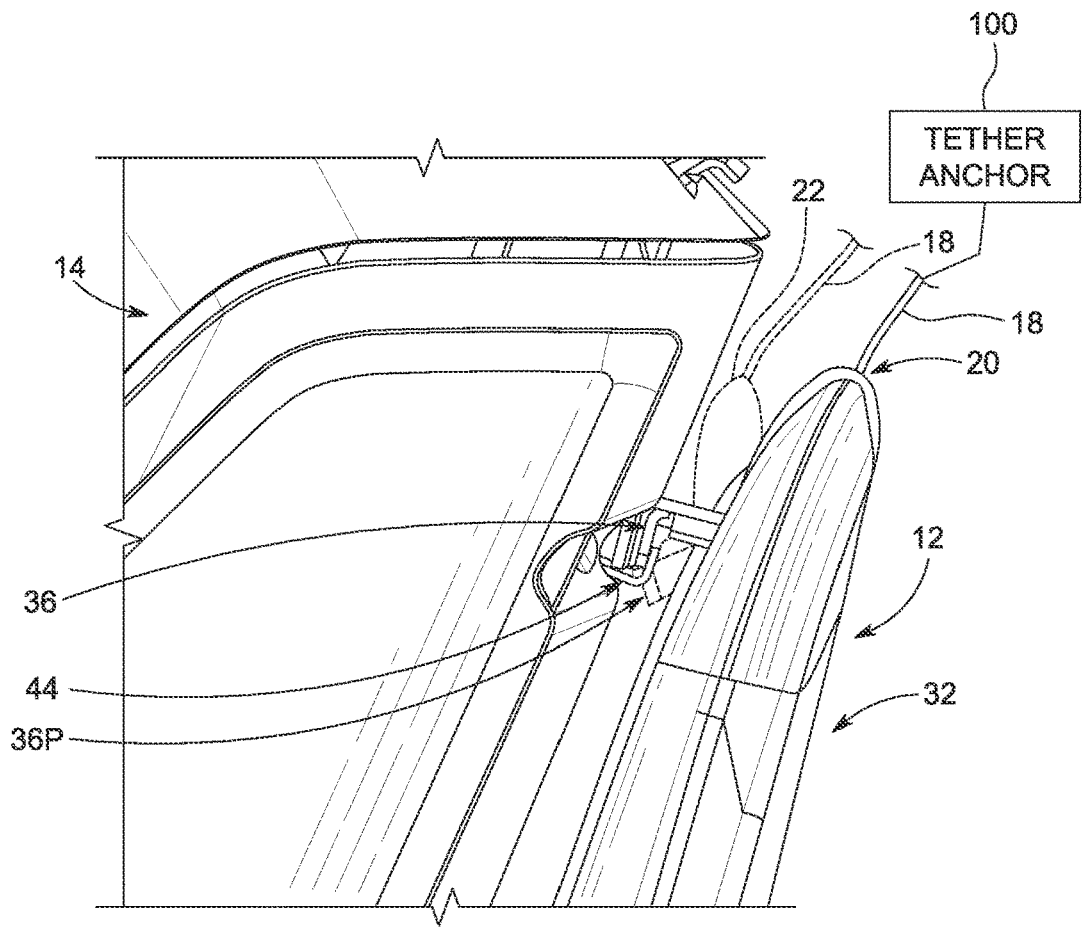
FIG. 7 is a side elevation view of a portion of the child restraint showing the juvenile seat in the forward-facing orientation and the juvenile-seat retainer received within the juvenile-seat retainer travel path and interlocked with a corresponding retainer support fixed to the seat base to block the juvenile seat from separating from the seat base during a front collision event.

The juvenile seat 14 is rotatable relative to the seat base 12 about a vertical pivot axis 14P between a forward facing arrangement and a rearward facing arrangement as suggested in FIGS. 1 and 6. The juvenile seat 14 includes a seat bottom 40 coupled to the foundation bottom 30, a seat back 42 arranged to extend upwardly from the seat bottom 40 and away from the foundation bottom 30, and a juvenile-seat retainer 44 fixed to the seat back 42 as shown in FIGS. 1 and 7. The juvenile-seat retainer 44 is configured to extend into and reside in the juvenile-seat retainer travel path 36P to interlock with the retainer support 36 in the forward facing orientation as shown in FIG. 7. Once interlocked with the retainer support 36, the juvenile-seat retainer 44 blocks separation and movement of the juvenile seat 14 relative to the seat base 12 to reinforce the connection between the seat base 12 and the juvenile seat 14 during impact events (i.e. a front collision event). In some embodiments, the rotation motion blocker 38 may cooperate with the retainer support 36 to bear loads from the juvenile seat via the juvenile-seat retainer 44. In some embodiments, the retainer support 36 may be movable with the rotation motion blocker 38.

The tether strap tension indicator 20 is configured to block full rotation of the juvenile seat 14 to the forward facing orientation until the tether strap 18 is fully installed as suggested in FIGS. 4, 5, and 7. For example, in the uninstalled position, the rotation motion blocker 38 obstructs the juvenile-seat travel path 36P so that the juvenile seat cannot reach the forward facing orientation. Thus, the juvenile seat retainer 44 and the retainer support provide a load-transfer system. Only when the tether strap mount 22 and the rotation motion blocker 38 reach the installed position can the juvenile-seat retainer 44 pass the rotation motion blocker 38 and enter the juvenile-seat retainer travel path 36P.

In the illustrative embodiment, the retainer support 36 is an L-shaped flange that is fixed in position to the seat base 12. In the illustrative embodiment, the juvenile-seat retainer 44 is also an L-shaped flange that is fixed in position to the juvenile seat 14. The shapes of the retainer support 36 and the juvenile seat retainer 44 are complementary so that they interlock with one another in the forward facing orientation as shown in FIG. 7.

The rotation motion blocker 38 includes a first rotation blocker 381 and a second rotation blocker 382 as shown in FIGS. 2 and 3. The first rotation motion blocker 381 is arranged to lie on a first side of the retainer support 36 to block rotation of the juvenile seat 14 from the rearward facing arrangement to the forward facing arrangement in a first direction about juvenile seat axis 14P. The second rotation motion blocker 382 is arranged to lie on a second side of the retainer support 36 to block rotation of the juvenile seat 14 from the rearward facing arrangement to the forward facing arrangement in a second direction opposite the first direction about juvenile seat axis 14P. Thus, the rotation motion blocker 36 blocks the juvenile seat 14 from rotating all the way to the forward facing orientation from both directions until the tether strap 18 is fully installed.

Another embodiment of a child restraint 210 including a seat base 212, a juvenile seat 214, and a tether strap tension indicator 220 is shown in FIGS. 8 and 9. The child restraint 210 is substantially similar to child restraint 10. Accordingly, similar reference numbers are used in the 200 series to describe similar features between child restraint 210 and child restraint 10. The description of child restraint 10 is hereby incorporated by reference herein for child restraint 210.

The seat base 212 includes a seat foundation 216, a tether strap 218 coupled to the seat foundation 216, and a tether strap tension indicator 220 coupled to the seat foundation 216 and the tether strap 218. The tether strap 218 is configured to extend over an upper end of the vehicle seat for attachment with a tether strap attachment point 100 on a rearward facing surface of the vehicle seat to block the seat base 212 from separating from the vehicle seat due to inertial forces. The tether strap tension indicator 220 is configured to indicate to a caregiver when the tether strap 218 has adequate tension so that the tether strap 218 is properly installed on the vehicle seat.

The tether strap tension indicator 220 includes a movable tether strap mount 222 coupled to the seat-base foundation 216 for pivotable movement between a first position (uninstalled position) when the tether strap 218 has an inadequate tension applied thereto and a second position (installed position) when the tether strap 218 has an adequate tension applied thereto. In the first position, the movable tether strap mount 222 extends outwardly away from a seat back of the vehicle seat toward the juvenile seat 214 and into a juvenile-seat region 234. In the second position, the movable tether strap mount 222 does not protrude toward the juvenile seat 214 to allow the juvenile seat 214 to rotate to a locked, forward-facing orientation relative to the seat base 212.

When the tether strap mount 222 is in the first position, the juvenile seat 214 is blocked from rotating to the locked, forward-facing orientation relative to the seat base 212. The movable tether strap mount 224 may include a first visual indicia 250 that is visible when the movable tether strap mount 222 is in the first position to indicate improper tether strap tension and a second visual indicia 252 that is visible when the movable tether strap mount 24 is in the second position to indicate proper tether strap tension. The visual indicia 250, 252 may be one or more of colors, icons, and/or text. For example, indicia 250 may be a red color to indicate improper installation while indicia 252 may be a green color to indicate proper installation.

The following numbered clauses are contemplated and non-limiting:

Clause 1. A child restraint includes a seat base adapted to rest on a vehicle seat.

Clause 2. The child restraint of clause 1, any other clause, or any suitable combination of clauses, further including a tether strap coupled to the seat base and configured to extend over an upper end of the vehicle seat for attachment with a tether strap attachment point on a rearward facing surface of the vehicle seat to block the seat base from separating from the vehicle seat due to inertial forces.

Clause 3. The child restraint of clause 2, any other clause, or any suitable combination of clauses, further including a tether strap tension indicator coupled to the seat base and the tether strap and configured to indicate to a caregiver when the tether strap has adequate tension so that the tether strap is properly installed.

Clause 4. The child restraint of clause 3, any other clause, or any suitable combination of clauses, wherein the tether strap tension indicator includes a pivot shaft mounted to the seat base, a movable tether strap mount coupled to the pivot shaft for pivotable movement between a first position when the tether strap has an inadequate tension applied thereto and a second position when the tether strap has an adequate tension applied thereto, and a biasing element configured to bias the movable tether strap mount toward the first position.

Clause 5. The child restraint of clause 4, any other clause, or any suitable combination of clauses, wherein in the first position the movable tether strap mount extends outwardly away from a seat back of the vehicle seat and in the second position the movable tether strap mount lays flat relative to a forward facing surface of the seat base.

Clause 6. The child restraint of clause 5, any other clause, or any suitable combination of clauses, further comprising a juvenile seat adapted to couple with the seat base and support a child, and wherein, when the tether strap mount is in the first position, the juvenile seat is blocked from coupling with the seat base.

Clause 7. The child restraint of clause 5, any other clause, or any suitable combination of clauses, wherein the movable tether strap mount includes a first visual indicia that is visible when the movable tether strap mount is in the first position to indicate improper tether strap tension and a second visual indicia that is visible when the movable tether strap mount is in the second position to indicate proper tether strap tension.

The invention claimed is:

1. A child restraint comprising
a seat base adapted to rest on a vehicle seat and
a juvenile seat adapted to couple to the seat base,
wherein the seat base includes a seat-base foundation configured to support the juvenile seat, a tether strap coupled to an upper end of the seat-base foundation and adapted to be fixed to a tether-strap anchor coupled to the vehicle seat, and a tether-strap tension indicator extending between and interconnecting the seat-base foundation and the tether strap and configured to move between an uninstalled position when the tether strap is separated from the tether-strap anchor, and an installed position when the tether strap is attached to the tether-strap anchor and a tension force is applied to the tether strap above a predetermined threshold, wherein the tether-strap tension indicator includes a tether strap mount coupled to the tether strap and a pivot shaft coupled to the tether strap mount and to the seat-base foundation to allow pivotable movement of the tether-strap tension indicator about a pivot shaft axis established by the pivot shaft between the uninstalled position and the installed position, wherein the seat-base foundation includes a foundation bottom and a foundation backrest coupled to the foundation bottom and arranged to extend upwardly away from the foundation bottom to define a juvenile seat region above the foundation bottom and forward of the foundation backrest, and wherein the tether strap mount protrudes into the juvenile seat region in the uninstalled position, and wherein the juvenile seat is rotatable relative to the seat base between a forward facing arrangement and a rearward facing arrangement, and wherein a portion of the juvenile seat is configured to engage the tether-strap tension indicator when the juvenile seat is rotated from the rearward facing arrangement to the forward facing arrangement and when the tether strap is in the uninstalled position to block the juvenile seat from reaching the forward facing arrangement until the tether-strap tension indicator is in the installed position.

2. The child restraint of claim 1, wherein the child restraint further includes a load-transfer system including a retainer support coupled to the seat base and a juvenile seat retainer coupled to the juvenile seat and aligned with the retainer support when the juvenile seat is in the forward facing arrangement to block the juvenile seat from moving away from the retainer support.

3. The child restraint of claim 1, wherein the foundation backrest has a first forward facing surface and the tether strap mount has a second forward facing surface that is flush with the first forward facing surface in the installed position.

4. The child restraint of claim 1, wherein the tether strap mount has a top edge that is aligned with a top edge of the foundation backrest in the installed position and that is misaligned with the top edge of the foundation backrest in the uninstalled position.

5. A child restraint comprising
a seat base adapted to rest on a vehicle seat and
a juvenile seat adapted to couple to the seat base,
wherein the seat base includes a seat-base foundation configured to support the juvenile seat, a tether strap coupled to an upper end of the seat-base foundation and adapted to be fixed to a tether-strap anchor coupled to the vehicle seat, and a tether-strap tension indicator extending between and interconnecting the seat-base foundation and the tether strap and configured to move between an uninstalled position when the tether strap is separated from the tether-strap anchor, and an installed position when the tether strap is attached to the tether-strap anchor and a tension force is applied to the tether strap above a predetermined threshold, wherein the tether-strap tension indicator includes a tether strap mount coupled to the tether strap and a pivot shaft coupled to the tether strap mount and to the seat-base foundation to allow pivotable movement of the tether-strap tension indicator about a pivot shaft axis established by the pivot shaft between the uninstalled position and the installed position, and wherein the tether-strap tension indicator further includes a rotation motion blocker coupled to the tether strap mount and arranged to extend toward the juvenile seat, and wherein the juvenile seat is rotatable relative to the seat base between a forward facing arrangement and a rearward facing arrangement, and wherein a portion of the juvenile seat is configured to engage the rotation motion blocker when the juvenile seat is rotated from the rearward facing arrangement to the forward facing arrangement and when the tether strap is in the uninstalled position to block the juvenile seat from reaching the forward facing arrangement until the tether-strap tension indicator is in the installed position.

6. The child restraint of claim 5, wherein the seat-base foundation includes a foundation bottom adapted to rest on a seat cushion and a foundation backrest that extends upwardly away from the foundation bottom, and wherein the tether-strap tension indicator is coupled to an upper end of the foundation backrest to at least partially define a top edge of the foundation backrest.

7. The child restraint of claim 6, wherein the foundation bottom and the foundation backrest cooperate to define a juvenile seat region above the foundation bottom and forward of the foundation backrest, and wherein the tether strap mount protrudes into the juvenile seat region in the uninstalled position.

8. The child restraint of claim 7, wherein the foundation backrest has a first forward facing surface and the tether strap mount has a second forward facing surface that is flush with the first forward facing surface in the installed position.

9. The child restraint of claim 7, wherein the tether strap mount has a top edge that is aligned with a top edge of the foundation backrest in the installed position and that is misaligned with the top edge of the foundation backrest in the uninstalled position.

10. A child restraint comprising
a seat base adapted to rest on a vehicle seat and
a juvenile seat adapted to couple to the seat base,
wherein the seat base includes a seat-base foundation configured to support the juvenile seat, a tether strap coupled to an upper end of the seat-base foundation and adapted to be fixed to a tether-strap anchor coupled to the vehicle seat, and a tether-strap tension indicator extending between and interconnecting the seat-base foundation and the tether strap and configured to move between an uninstalled position when the tether strap is separated from the tether-strap anchor, and an installed position when the tether strap is attached to the tether-strap anchor and a tension force is applied to the tether strap above a predetermined threshold, wherein the juvenile seat is rotatable relative to the seat base between a forward facing arrangement and a rearward facing arrangement and the child restraint further includes a load-transfer system including a retainer support coupled to the seat base and a juvenile seat retainer coupled to the juvenile seat and aligned with the retainer support when the juvenile seat is in the forward facing arrangement to block the juvenile seat from moving away from the retainer support, and wherein the tether-strap tension indicator includes a tether strap mount coupled to the tether strap and a rotation motion blocker coupled to the tether strap mount to extend toward the juvenile seat and is configured to engage the juvenile seat retainer when the juvenile seat is rotated from the rearward facing arrangement to the forward facing arrangement and when the tether strap is in the uninstalled position to block the juvenile seat from reaching the forward facing arrangement until the tether-strap tension indicator is in the installed position.

11. The child restraint of claim 10, wherein the rotation motion blocker includes a first rotation blocker arranged to lie on a first side of the retainer support to block rotation of the juvenile seat from the rearward facing arrangement to the forward facing arrangement in a first direction and a second rotation blocker arranged to lie on a second side of the retainer support to block rotation of the juvenile seat from the rearward facing arrangement to the forward facing arrangement in a second direction opposite the first direction.

12. The child restraint of claim 10, wherein the tether-strap tension indicator further includes a pivot shaft coupled to the seat back and the tether-strap tension indicator is configured to pivot about a horizontal axis defined by the pivot shaft between the installed and uninstalled positions.

13. The child restraint of claim 12, wherein the tether-strap tension indicator is biased toward the uninstalled position by a spring.

14. A seat base for a child restraint adapted to rest on a vehicle seat, the seat base comprising
a seat-base foundation,
a tether strap coupled to an upper end of the seat-base foundation and adapted to be fixed to a tether-strap anchor coupled to the vehicle seat, and
a tether-strap tension indicator extending between and interconnecting the seat-base foundation and the tether strap and configured to move between an uninstalled position when the tether strap is separated from the tether-strap anchor, and an installed position when the tether strap is attached to the tether-strap anchor and a tension force is applied to the tether strap above a predetermined threshold,
wherein the tether-strap tension indicator includes a tether strap mount coupled to the tether strap and a pivot shaft coupled to the tether strap mount and to the seat-base foundation to allow pivotable movement of the tether-strap tension indicator about a pivot shaft axis established by the pivot shaft between the uninstalled position and the installed position,
wherein the seat-base foundation includes a foundation bottom and a foundation backrest coupled to the foundation bottom and arranged to extend upwardly away from the foundation bottom to define a juvenile seat region above the foundation bottom and forward of the foundation backrest, and wherein the tether strap mount protrudes into the juvenile seat region in the uninstalled position, and
wherein the foundation backrest has a first forward facing surface and the tether strap mount has a second forward facing surface that is flush with the first forward facing surface in the installed position.

15. The seat base of claim 14, wherein the tether-strap tension indicator is biased toward the uninstalled position by a spring.

16. A seat base for a child restraint adapted to rest on a vehicle seat, the seat base comprising
a seat-base foundation,
a tether strap coupled to an upper end of the seat-base foundation and adapted to be fixed to a tether-strap anchor coupled to the vehicle seat, and
a tether-strap tension indicator extending between and interconnecting the seat-base foundation and the tether strap and configured to move between an uninstalled position when the tether strap is separated from the tether-strap anchor, and an installed position when the tether strap is attached to the tether-strap anchor and a tension force is applied to the tether strap above a predetermined threshold,
wherein the tether-strap tension indicator includes a tether strap mount coupled to the tether strap and a pivot shaft coupled to the tether strap mount and to the seat-base foundation to allow pivotable movement of the tether-strap tension indicator about a pivot shaft axis established by the pivot shaft between the uninstalled position and the installed position,
wherein the seat-base foundation includes a foundation bottom and a foundation backrest coupled to the foundation bottom and arranged to extend upwardly away from the foundation bottom to define a juvenile seat region above the foundation bottom and forward of the foundation backrest, and wherein the tether strap mount protrudes into the juvenile seat region in the uninstalled position, and
wherein the tether strap mount has a top edge that is aligned with a top edge of the foundation backrest in the installed position and that is misaligned with the top edge of the foundation backrest in the uninstalled position.

* * * * *